(12) United States Patent
Wood, III et al.

(10) Patent No.: US 6,350,539 B1
(45) Date of Patent: Feb. 26, 2002

(54) COMPOSITE GAS DISTRIBUTION STRUCTURE FOR FUEL CELL

(75) Inventors: David L. Wood, III, Rochester, NY (US); Stephen A. Grot, Bear, DE (US); Gerald Fly, Genesco, NY (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 09/426,294

(22) Filed: Oct. 25, 1999

(51) Int. Cl.[7] .................................................. H01M 2/00
(52) U.S. Cl. .............................. 429/34; 429/12; 429/13; 429/19; 429/28; 429/40; 429/44
(58) Field of Search .............................. 429/12, 13, 19, 429/28, 34, 40, 44

(56) References Cited

U.S. PATENT DOCUMENTS 6,103,077 A * 8/2000 DeMarinis et al. .... 204/290.07
6,106,965 A * 8/2000 Hirano et al. .................. 429/30
6,194,094 B1 * 2/2001 Sugawara et al. ............ 429/13

* cited by examiner

Primary Examiner—Carol Chaney
Assistant Examiner—Dah-Wei D. Yuan
(74) Attorney, Agent, or Firm—A. Luke Simon; Kalr F. Barr, Jr.; Linda M. Deschere

(57) ABSTRACT

There is provided a multilayer gas distribution structure for use with a membrane electrode assembly of a PEM fuel cell. The layers of the multilayer diffusion structure have selected chemical and physical properties. Together, the layers facilitate transport of reactant gas to the electrode while improving water management.

22 Claims, 7 Drawing Sheets

COMPOSITE GAS DISTRIBUTION STRUCTURE FOR FUEL CELL

FIELD OF THE INVENTION

This invention relates to a fuel cell system and more particularly to a system having a plurality of cells which consume an $H_2$-rich gas to produce power for vehicle propulsion.

BACKGROUND OF THE INVENTION

Fuel cells have been used as a power source in many applications and have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive solid polymer electrolyte membrane having the anode on one of its faces and the cathode on the opposite face. The MEA is sandwiched between a pair of electrically conductive elements which (1) serve as current collectors for the anode and cathode, and (2) contain appropriate channels and/or openings therein for distributing the fuel cell's gaseous reactants over the surfaces of the respective anode and cathode catalysts. A plurality of individual cells are commonly bundled together to form a PEM fuel cell stack. The term fuel cell is typically used to refer to either a single cell or a plurality of cells (stack) depending on the context. A group of cells within the stack is referred to as a cluster. Typical arrangements of multiple cells in a stack are described in U.S. Pat. No. 5,763,113, assigned to General Motors Corporation.

In PEM fuel cells hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and admixed with a proton conductive resin. The catalytic particles are typically costly precious metal particles. These membrane electrode assemblies which comprise the catalyzed electrodes are relatively expensive to manufacture and require certain controlled conditions in order to prevent degradation thereof.

For vehicular applications, it is desirable to use a liquid fuel such as an alcohol (e.g., methanol or ethanol), or hydrocarbons (e.g., gasoline) as the source of hydrogen for the fuel cell. Such liquid fuels for the vehicle are easy to store onboard and there is a nationwide infrastructure for supplying liquid fuels. However, such fuels must be dissociated to release the hydrogen content thereof for fueling the fuel cell. The dissociation reaction is accomplished heterogeneously within a chemical fuel processor, known as a reformer, that provides thermal energy throughout a catalyst mass and yields a reformate gas comprising primarily hydrogen and carbon dioxide. For example, in the steam methanol reformation process, methanol and water (as steam) are ideally reacted to generate hydrogen and carbon dioxide. The reforming reaction is an endothermic reaction that requires external heat for the reaction to occur.

Fuel cell systems which process a hydrocarbon fuel to produce a hydrogen-rich reformate for consumption by PEM fuel cells are known and are described in co-pending U.S. patent application Ser. Nos. 08/975,442 and 08/980,087, filed in November, 1997, and U.S. Ser. No. 09/187,125, filed in November, 1998, and each assigned to General Motors Corporation, assignee of the present invention. A typical PEM fuel cell and its membrane electrode assembly (MEA) are described in U.S. Pat. Nos. 5,272,017 and 5,316,871, issued respectively December 21, 1993 and May 31, 1994, and assigned to General Motors Corporation.

Efficient operation of a fuel cell depends on the ability to effectively disperse reactant gases at catalytic sites of the electrode where reaction occurs. In addition, effective removal of reaction products is required so as to not inhibit flow of fresh reactants to the catalytic sites. Therefore, it is desirable to improve the mobility of reactant and product species to and from the MEA where reaction occurs.

SUMMARY OF THE INVENTION

The present invention contemplates a diffusion structure which enhances mass transport to and from an electrode in a membrane electrode assembly (MEA) of a fuel cell. The diffusion structure cooperates and interacts with an electrode at a major surface of the electrode opposite the membrane electrolyte of the cell. The diffusion structure is a composite diffusion medium which facilitates the supply of reactant gas to the electrode. The diffusion structure also facilitates movement of water. The diffusion structure includes a characteristic bulk layer having two or more portions, each with properties defined below, including hydrophobicity and surface energy. The bulk layer is useable alone to function as a diffusion structure. However, it is preferably combined with an absorption layer and a desorption layer on respective sides of the bulk layer to form a preferred diffusion structure.

The diffusion structure preferably comprises an absorption layer which has a first electrically conductive material. The absorption layer has a surface facing or engaging the major surface of the electrode structure; and the absorption layer accepts water from the electrode structure. Water is a product of the reaction in the cell between hydrogen and air at the cathode.

The diffusion structure also comprises the bulk layer which has a second electrically conductive material. The bulk layer has a surface facing or engaging a major surface of the absorption layer opposite the electrode structure. The bulk layer has at least two portions, the first portion is less hydrophobic than the second portion. The first portion is nearest the absorption layer.

The diffusion structure preferably further comprises a desorption layer which has a third electrically conducted material. The desorption layer has a surface facing or engaging the second portion of the bulk layer, and an opposite surface facing away from the electrode structure. Water is released at this opposite surface of the desorption layer.

Preferably, the bulk layer comprises at least one intermediate portion between the first and second portions, where the hydrophobicity of each of the intermediate portions is greater than the first portion and less than the second portion. Preferably, the hydrophobic character of each intermediate portion is selected so that hydrophobicity increases in a direction away from the membrane electrode assembly. Preferably, a plurality of intermediate layers is arranged between the first and second portions, with decreasing surface energy and increasing hydrophobicity in the direction from the first portion to the second portion. Preferably, the diffusion structure is further characterized by increasing hydrophobicity and by decreasing surface energy in a direction from the electrode toward the opposite surface of the desorption layer.

In another aspect of the invention, specific materials are selected for the absorption layer, the bulk layer, and the desorption layer to provide the properties of surface energy, hydrophobicity, and corresponding hydrophilicity to optimize movement of reactant gases in a direction toward the membrane electrode assembly and to move product gases and water in a direction away from the membrane electrode assembly. Accordingly, the absorption layer preferably comprises the first electrically conductive material dispersed in a fluorinated polymeric binder (PVDF). The bulk layer first portion preferably consists essentially of the second electrically conductive material. The second portion of the bulk layer comprises the second electrically conductive material intermingled with polytetrafluoroethylene (PTFE). The amount by weight of the PTFE is less than the amount of the electrically conductive material in the second portion. The desorption layer preferably comprises the third electrically conductive material intermingled with PTFE, and the amount of PTFE relative to the third electrically conductive material is greater than the amount of PTFE relative to the second electrically conductive material in the second portion of the bulk layer. In one aspect, the three electrically conductive materials differ from one another.

In another aspect, the characteristics of the layers are further understood by reference to designated numbered surfaces of the layers. The electrode structure has a first surface facing or engaging the electrolyte for forming a part of the MEA. The second surface of the electrode structure faces or engages the absorption layer's third surface. The absorption layer's fourth surface faces or engages the fifth surface of the bulk layer and the bulk layer's sixth surface faces or engages the seventh surface of the desorption layer. The desorption layer's eighth surface is furthest away from the MEA. Here, the bulk layer comprises at least two portions, the first portion of the bulk layer is adjacent its fifth surface and the second portion of the bulk is adjacent its sixth surface. The first portion has a material with a surface energy greater than the surface energy of the material of the second portion. Here, decreasing surface energy is provided between the fifth and sixth surfaces of the bulk layer. As described above, the bulk layer preferably comprises at least one intermediate portion between the first and second portions. The surface energy of the materials of each intermediate portion is between that of the surface energy of the material of the first portion and the material of the second portion.

Preferably, the surface energy of the material of the fourth surface of the absorption layer and the fifth surface of the bulk layer are approximately the same. Preferably, the surface energy of the materials of the sixth surface of the bulk layer and the seventh surface of the desorption layer are approximately the same and distinctly different from the surface energies of the materials of the fourth and fifth surfaces. Preferably, the absorption layer, bulk layer, and desorption layer are formed of materials which provide decreasing surface energy between the second surface of the electrode structure and the eighth surface of the desorption layer which is the surface of the diffusion structure furthest away from the MEA.

In another aspect, the invention provides a diffusion structure having the characteristic of the bulk layer which has at least two portions which are characterized by decreasing surface energy and increasing hydrophobicity in a direction from the electrode surface outward. The bulk layer, having features as described above, is used alone or in combination with any of the absorption and desorption layers described above. Therefore, if desired, an absorption layer is interposed between the bulk layer and the electrode layer. If desired, a desorption absorption layer is used in combination with the bulk layer. Although it is possible to use the bulk layer with its specific characteristics as the only layer for transport of reactive gases, product gases and particularly water, it is preferred to use the bulk layer in combination with an absorption layer which is formed of an electrically conductive material that is different from the electrically conductive material provided in the bulk layer. The combination is further enhanced by the use of the desorption layer which comprises another electrically conductive material which is different from the electrically conductive material provided in the bulk layer and the absorption layer.

The present diffusion structure arrangement when used in combination with a membrane electrode assembly and particularly the cathode structure of such assembly, effectively disperses reactant gases at the catalytic site of the electrode where reaction occurs. In addition, the diffusion structure effectively removes reaction products, particularly water, so as not to inhibit flow of fresh reactants to the catalytic site. Therefore, the diffusion structure of the invention provides the desirable features of improved mobility of reactant and product species to and from the MEA to facilitate and enhance its performance.

BRIEF DESCRIPTION OF THE DRAWING

The various features, advantages and other uses of the present invention will become more apparent by referring to the following description and drawings in which.

DETAILED DESCRIPTION OF THE EMBODIMENTS

In one aspect, there is provided a multilayer gas distribution structure for use with a membrane electrode assembly of a PEM fuel cell. The layers of the multilayer diffusion structure have selected chemical and physical properties. Together, the layers facilitate transport of reactant gas to the electrode while improving water management. Water is the product of the fuel cell reaction. This layered structure is particularly useful when applied to the outer surface of the cathode electrode. This is the cathode surface which faces away from the membrane electrode assembly (MEA). The term "membrane electrode assembly" as used herein refers to the combination of the solid polymer membrane and catalytic electrode reaction layers thereon in the fuel cell assembly, regardless of its configuration or method of preparation. The layer of membrane material containing the catalyst is referred to as the "active layer," regardless of whether the catalyst is incorporated into a discrete layer of polymer and applied or laminated to the surface of the membrane, or incorporated into the membrane itself.

Figure 1:
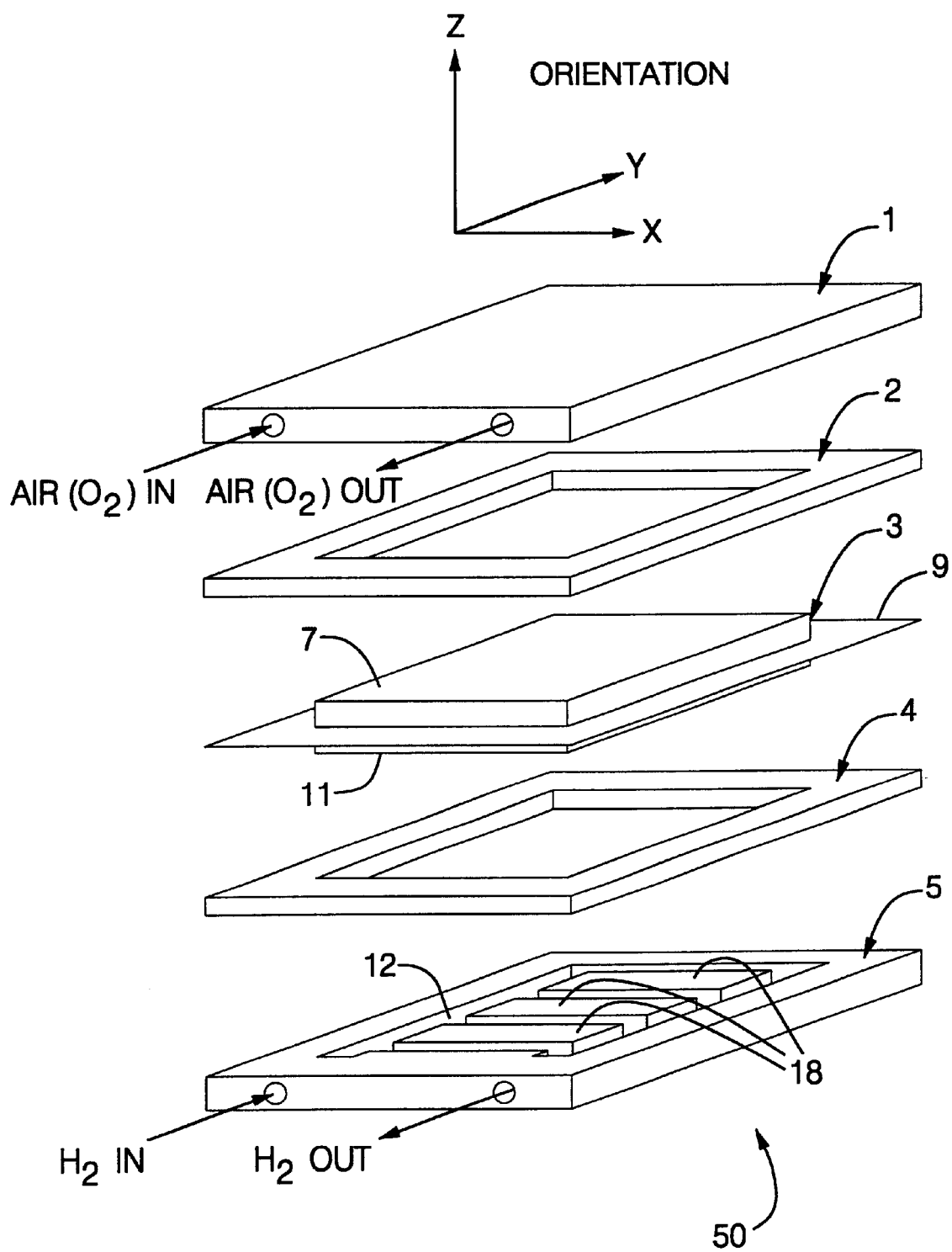
FIG. 1 is a schematic view of an unassembled fuel cell assembly which includes a membrane electrode assembly and diffusion structures according to the invention.

A schematic of a proton exchange membrane (PEM) fuel cell assembly 50 is shown in FIG. 1. The assembly comprises the membrane electrode assembly 3 (FIG. 2) which comprises an ionomer membrane 9. An anode electrode 10 is on one side of the membrane 9, and a cathode electrode 8 is on the other side. Cathode diffusion structure 7 is on the side of the cathode electrode 8 facing away from the membrane 9. Anode diffusion structure 11 is on the side of the anode facing away from the membrane 9. The anode side further includes a plate 5 (FIG. 1) which serves as a gas distribution and current collector. The plate 5 may be an end plate or a bipolar plate that serves to separate adjacent cells in a fuel cell stack. Optionally, gasket 4 is included between structure 11 and plate 5. Plate 5 has surface features in the form of recesses which provide a fuel gas flow channel 6; and un-recessed feature referred to as lands 18. The cathode side is similarly configured with a plate 1 having surface features as described earlier for the anode, for distributing oxidant gas, and is electrically conductive. Optionally, gasket 2 is included between diffusion structure 7 and plate 1.

In the electrochemical fuel cell 50 of the invention, the membrane 9 is a cation permeable, proton conductive membrane, having H$^+$ ions as the mobile ion; the fuel gas is hydrogen and the oxidant is oxygen or air. The overall cell reaction is the oxidation of hydrogen to water and the respective reactions at the anode 10 and cathode 8 are as follows:

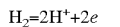

$H_2 = 2H^+ + 2e$

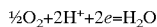

$½O_2 + 2H^+ + 2e = H_2O$

Since hydrogen is used as the fuel gas, the product of the overall cell reaction is water. Typically, the product water is rejected at the cathode 8 which is a porous electrode comprising an electrocatalyst layer on the oxygen side. In early cells, water escaped by simple flow or by evaporation. However, means are now provided for collecting the water as it is formed and carrying it away from the MEA of the cell.

Figure 2:
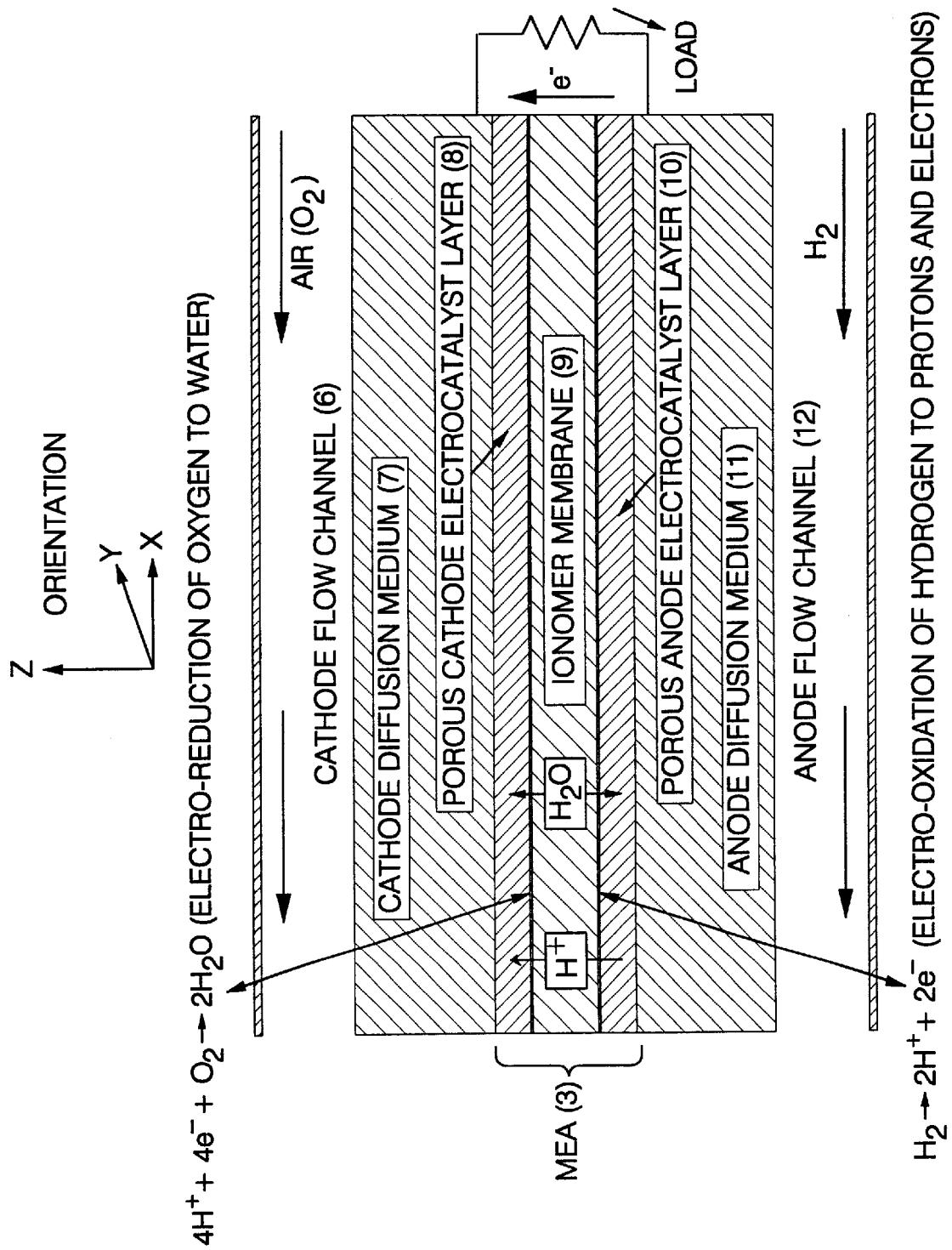
FIG. 2 is a pictorial illustration of a cross-section of a membrane electrode assembly according to the invention.

Water management in the cell is important and key to the successful long-term operation of an electrochemical fuel cell as shown in FIG. 1 and its MEA as particularly shown in FIG. 2. Spatial variations of water content within the polymeric electrolyte membrane 9 of a current-carrying fuel cell result from the electroosmotic dragging of water with proton (H$^+$) transport from anode to cathode, the production of water by the oxygen reduction reaction at the cathode, humidification conditions of the inlet gas stream, and "back-diffusion" of water from cathode to anode.

In the fuel cell prepared according to the invention, the diffusion structure aids in the water management in the cell. Before further describing the invention, it is useful to understand the water management problems posed by PEM fuel cells and the design criteria developed in accordance with the present invention to overcome such problems.

Proton exchange membrane (PEM) fuel cells according to the invention have diffusion structures 7 and 11 adjacent or engaging both the cathode and anode so that the entire surface of the electrode reaction layers 8 and 10, are utilized (see FIGS. 1 and 2). The diffusion structure acts as diffusion medium to cooperate with the electrode and the rigid, non-porous material used for plates 1, 5 which have flow field channels (grooves) 6, 12. The electrons are conducted through the lands 18 that define the channels of the flow fields, within the bipolar plates 1, 5. If there were no diffusion structure, the lands 18 would block gas transport to the portions of the electrode reaction layer they engage and prevent access thereto by the respective H$_2$ and O$_2$ reactants.

The diffusion structures also protect the electrode reaction layers 8, 10 by keeping their intricate and delicate structures intact and provide structural support for the perimeter area of the ionomer membrane 9. Compared to earlier cells, introduction of the diffusion mediums into modern PEM fuel cells effectively adds a mass transport barrier and an additional interface to both the anode and cathode. Hence, the cathode diffusion structure must be constructed and arranged to transport excess liquid water in the opposite direction of the vapor phase reactant flux (along the z axis), without significantly inhibiting the vapor transport. This is particularly the case when the operating temperature is low (less than about 80° C.), the operating pressure is high (greater than about 200 kPa absolute), and the cathode relative humidity is greater than 25%. Since the higher the pressure and the lower the temperature, the lower will be the ability for the water to enter into the vapor phase. This situation can result in deleterious flooding conditions at the cathode side, especially at high current densities (greater than about 0.5 A/cm$^2$).

PEM fuel cells perform better with increasing pressure, and the typical automotive system requires that the PEM fuel cell stack(s) operate at greater than about 0.8 A/cm$^2$ to make enough power. A further design challenge is that as long as the proton-exchange membrane itself requires a mobile phase to be sufficiently ionically conductive (i.e. transporting protons at a sufficient rate to sustain the electro-reduction of oxygen molecules), then liquid water must be present to some extent directly adjacent to the membrane. More specifically, it has been verified experimentally that polysulfonated fluoroionomers, such as Nafion(s)™ and GORE-SELECT™ (the current state-of-the art membrane materials for PEM fuel cells), can require as much as 20 water molecules per proton to function properly in a PEM fuel cell.

The end conclusion is, then, that if a PEM fuel cell stack is to provide sufficient power for an automotive system while operating at higher pressures and higher current densities (using current state-of-the-art proton-exchange membrane materials), there must be present a cathode diffusion structure that can remove practically all of the liquid water at the cathode that is not required and absorbed by the membrane. The diffusion structure, and its interfaces with the electrode layer 8 and lands 18, must also remain electrically conductive while performing all of these functions.

Since the flow field designs in many PEM fuel cells do not themselves introduce flow of reactant gases into the diffusion structures (see FIG. 2), they do not aid in reactant distribution and product removal through the plane (z-direction). Therefore, the mechanisms for liquid water transport away from the cathode catalyst layer 8 are a combination of: (1) hydraulic forces exerted in the direction normal to the reaction layer (along the z axis) resulting from liquid-water "build-up"; and (2) surface tension from solid/liquid-phase interactions brought about by differences in the chemical nature and physical characteristics of the two phases.

The liquid water build-up at the cathode arises from the generation of water molecules by the oxygen electro-reduction reaction occurring within the cathode reaction layer 8 and the accumulation of water molecules transported across the membrane 9 from the anode catalyst layer 10 by proton electro-osmosis. If a large amount of hydraulic pressure is required to move a local volume element of water, "localized" flooding of the cathode catalyst layer and/or cathode diffusion medium must also be occurring.

For maximum performance (see FIG. 3), water removal at the cathode is accomplished by the invention by inducing a surface-energy gradient between the electrode interface 13 and the flow channel interface 17. This gradient allows liquid-water transport to become less dependent on the pressure build-ups mentioned in mechanism (1) described above. Multilayering of the cathode diffusion structure to achieve this gradient is accomplished by the invention. A new diffusion structure, with three or more distinct layers, is used in place of a conventional single-layer, homogeneously-hydrophobidized cathode diffusion structure. The three layers are distinguished by their respective hydrophobicity, pore-size distribution, mean and mode pore size, surface area, porosity (or specific pore volume), bulk density, chemical make-up or ingredients, and physical processing. Two outer layers, which are adjacent to the electrode and flow channel interfaces (13 and 17, respectively), enclose one or more center layers. In addition to their water handling abilities at the electrode and flow channel interfaces, the material of these outer layers reduce the contact resistances inherent to the cathode diffusion material. Therefore, the outer layers have a dual functionality in that they are liquid-transfer enhancing layers and contact-resistance reducing layers. Preferably, the three layers overlap one another. Hereafter, the three regions will be referred to by the following names. The region adjacent to the electrode interface 13 is the absorption layer 14 and is characterized by low hydrophobicity, low mean pore size, high surface area, and high porosity. The region adjacent to the absorption layer (middle region) is the bulk transport layer 15 and is characterized by intermediate hydrophobicity, intermediate mean pore size, high surface area, and intermediate porosity. The region adjacent to the flow field plate 1 is the desorption region 16 and is characterized by high hydrophobicity, high mean pore size, intermediate surface area, and high porosity.

It is appropriate to mention here that hydrophobicity is defined as a contact angle greater than 90° when a droplet of the liquid in question (water for this case) is placed in intimate contact with the solid in question. The angle between any tangent of the droplet formed and the solid surface comprises a designated contact angle. Hydrophilicity is then a value of less than 90° for that same angle. The designation of intermediate hydrophobicity refers to a condition where the contact angle is generally between about 70° and about 110°. The intermediate condition is less hydrophobic than the condition of relatively high hydrophobicity, where the angle is more than 110° facilitating desorption. The intermediate condition is less hydrophilic than the condition of relatively high hydrophilicity, where the angle is less than 70° to facilitate absorption. For simplicity, this intermediate condition is referred to as intermediate hydrophobicity or hydrophilicity. This is further understood in the context of the character of layers of material related to one another.

Figure 3:
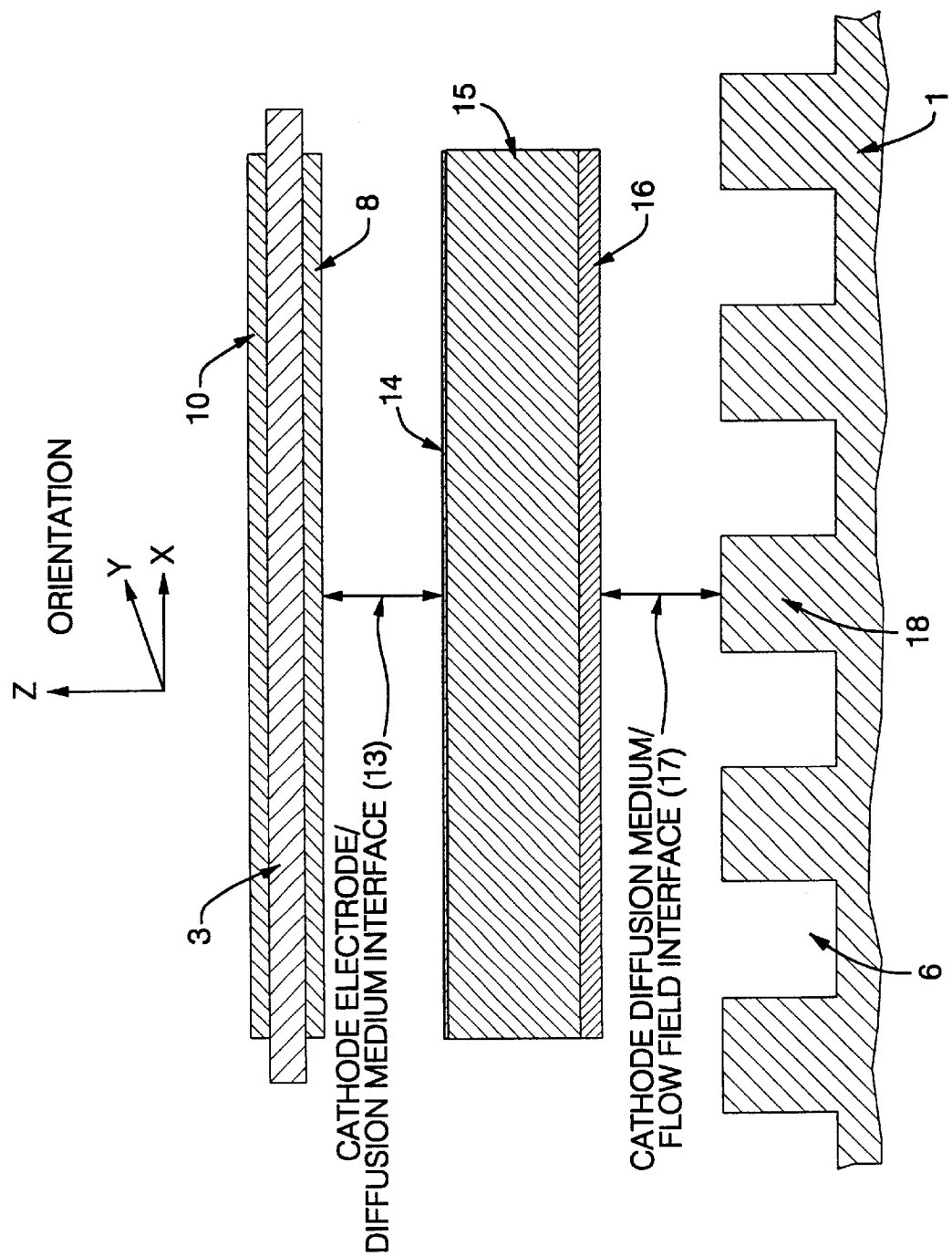
FIG. 3 is an exploded cross sectional view of a multilayered diffusion structure.

The thickness of the layers will vary depending on the geometry of the PEM cell. Representative thicknesses are discussed below. The relative nature of the dimension (x and y) in FIGS. 1–3 are more important than the absolute value of dimension. In a preferred embodiment, the absorption layer is no less than 20 $\mu$m and no more than 150 $\mu$m; the bulk transport layer is no less than 100 $\mu$m and no more than 750 $\mu$m; and the desorption layer is no less than 40 $\mu$m and no more than 400 $\mu$m. All thicknesses are for an uncompressed state of the layers as assembled and before being compressed in an assembled PEM fuel cell stack.

Within the individual layers, the bulk density, pore-size distribution, and porosity will govern the value of the surface area parameter. However, the material selection, processing of the layers, and values of the previously mentioned parameters result in the absorption layer having the highest surface area and the desorption layer having the lowest. The layer(s) in between should have decreasing surface area with respect to the adjacent layer moving in a direction outward from the MEA 3. The parameter of bulk density is governed by materials selection for each layer. Preferably, all layers should have a bulk density of no more than 3 g/cm$^3$ to ensure that the multiple-layered structure does not become too heavy.

The substrate material for the absorption layer 14 comprises electrically conductive particles in a binder matrix. The particles include, but not limited to, any graphite, carbon, or corrosion-resistant metallic powders such as, but not limited to, metallic carbides, metallic nitrides, metallic borides, metallic silicates, metallic oxides, or any combinations thereof. Metalloid powders may also be used. All of these materials may be purchased commercially in a variety of particle sizes. Desirably, substrate particle-sizes should be no less than 0.025 $\mu$m and no more than 2.5 $\mu$m, but preferably 0.05 to 0.75 $\mu$m. Preferably, the powder is mixed with a material that serves as the support binder for the conductive particles. The support binder is preferably a mildly hydrophobic or hydrophilic material such as polyvinylidine fluoride (PVDF), polyvinyl alcohols, polystyrenes, organic silicates, aliphatic silanes, or any other polymer or organic material having the desired properties. The material preferably is purchased as a raw ingredient in particle form (over the entire range of available molecular weights for polymer materials) either as a powder, dispersion, suspension, or any other heterogeneous mixture. Size of the support-binder particles should be no less than 0.01 $\mu$m and no more than 1 $\mu$m, but preferably between 0.025 and 0.5 $\mu$m.

Construction of the absorption layer preferably is accomplished by mixing the conductive powder and the support binder material (including the solvent and/or dispersion agent supplied by the manufacturer) together with a diluting agent. The diluting agent acts as a dispersing medium for the conductive particles and as a dispersing medium or solvent (whichever is appropriate) for the binder support material. A diluting agent, such as water, alcohols, ketones, esters, or organic acids, is used to combine these materials such that a well-mixed colloid is obtained. This mixture is referred to as the absorption-layer dispersion. A surfactant(s) may then be added to control particle and/or agglomerate sizes, thereby improving the absorption-layer dispersion quality.

Adequate mixing of the above materials is achieved by stirring, ball milling, agitating (shaking), blowing, or heat-treatment; however, the method of mixing should not alter any chemical structures of the materials, or cause undesired shearing, agglomeration, or fragmentation of any particles. After completion of mixing, the absorption-layer dispersion is placed onto the bulk transport layer 15, the bulk transport layer acts as a substrate surface for application of the absorption layer. Application of the absorption-layer dispersion to the bulk transport layer is preferably accomplished in a humidity-controlled, contaminant-free environment. Conventional techniques are used such as, but not limited to, spraying, draw-bar coating, roll coating, face coating, curtain coating, painting, hot-pressing, etc. Spraying is preferred. The process preferably takes place at less than 75% relative humidity if a chemical other than water is used for the diluting/mixing agent; and greater than 50% relative humidity if water is used. Mixing and handling is preferably done in a clean room. The clean room should be at least a class 100,000 clean room, most preferably class 10,000. Temperature during application may also be controlled to any desired value, but the procedure should preferably take place at room temperature.

Upon completion of the above application process, the resulting two-layer structure is heat-treated for at least 20 minutes but preferably not more than 2 hours total, preferably in two distinct steps (3 or more if any surfactants are used) with different temperatures. This is referred to as a heat cycle. First, a drying step should be performed at 10° C. higher than the boiling point of the diluting/mixing agent for 55–75% of the total heat-treatment time. It is followed by a sintering/melting step performed at the sintering/melting temperature of the material used as the support binder, for 25–45% of the total heat-treatment time. At the end of this heat cycle, the absorption-layer dispersion will have been transformed into a solid mesoporous structure which constitutes the absorption layer 14. It is desired to have a pore-size distribution of no less than 0.01 $\mu$m and no more than 5 $\mu$m, a mode pore-size of between 0.05 $\mu$m and 2 $\mu$m, and a mean pore-size of between 0.1 $\mu$m and 1 $\mu$m. The absorption layer should be firmly bound to the bulk transport layer upon completion of the heat cycle.

Base materials for the bulk transport layer 15 preferably is any paper, felt, mat, or cloth made of carbon, graphite, or a carbon/graphite blend, which may also have a resin-type binding material for the individual fibers. Alternatively, the base material is any metal, alloy, metallic compound, or blends of the materials which are electrically conductive. The form of the material is not limited and may include meshes, screens, foams, wovens, non-wovens, and the like. The base material for this layer preferably has a pore-size distribution of no less than 0.5 $\mu$m and no more than 60 $\mu$m, a mode pore-size between 1 $\mu$m and 50 $\mu$m, and a mean pore-size between 5 $\mu$m and 40 $\mu$m.

The bulk transport layer is preferably chemically treated with any non-electrically resistive polymer material having intermediate hydrophobicity after treatment. Specifically, it should be characterized by having hydrophobicity appreciably less than that corresponding to 40 wt % polytetrafluoroethylene (PTFE), within the same layer, if PTFE was used as the chemical treatment. The polymer material for chemical treatment may be purchased in any of the forms of solutions, suspensions, dispersions or any other heterogeneous mixture. (This mixture is referred to as the bulk-transport-layer chemical agent). It may include a dispersing agent and/or surfactant(s) and may be diluted with a solvent. The surfactant(s) may be any known chemical(s) in any form, which assists molecules of another type in penetrating the pores of a solid by controlling wetting, droplet size, or both. No bounds for particle sizes (if material is not in solution) are required for the chemical agent except that the particle sizes must be small enough to permit satisfactory penetration of the polymer particles into the base material pores upon application.

Application of the chemical agent to the base material of the bulk transport layer 15 may be accomplished through spraying, dipping, draw-barring, or rolling, but is not limited to these techniques. Finally it is heat-treated in at least two separate steps consisting of a total heating time of no less than 20 minutes and no more than 2 hours. In a preferred process, the first step is a drying step at 10° C. above the boiling point of the diluent/solvent used with the chemical agent (20–35% of the total heat-cycle time). A curing step volatilizes any surfactant(s) or remaining solvent at a temperature 10° C. above the boiling point of the surfactant(s) used (15–30% of the total heat-cycle time). A sintering/melting step follows at the sintering/melting temperature for the polymer material (10–20% of the total heat-cycle time). If no surfactant(s) is used, then the curing step is eliminated.

The chemical treatment used here should not take up any more than 20% of the porosity (defined as void volume fraction) of the original base material. Preparation of the bulk transport layer 15 should be completed before addition of the absorption layer 14 as described previously. Upon completion of the associated chemical treatment of the bulk transport layer 15, at least 5% of the thickness of the layer preferably is modified to obtain surface enhancement by polishing, grinding, sanding, or any other equivalent means. However, this optional step, if incorporated, should also be completed immediately prior to the application of the absorption layer 14 to the bulk transport layer 15, and the surface-enhanced side of the bulk transport layer 15 is placed immediately adjacent to the absorption layer 14.

There may be any number of bulk transport layers with the following stipulation. The properties of each bulk transport layer must be sequenced to follow a given direction of the surface energy gradient. Preferably, an additional bulk transport layer should be more hydrophobic, have greater mean and mode pore-sizes, have greater porosity, and contain less surface area than the preceding bulk transport layer, moving in the direction outward from the MEA. In this arrangement, the surface energy of the absorption layer is at least as great, and preferably greater than the (innermost) bulk transport layer; and the surface energy of the desorption layer is no more than, and preferably less than, the (outermost) bulk transport layer. This "decreasing" surface energy gradient is achieved by the properties shown in Table 1. Additional bulk transport layers should be processed prior to the bulk transport layer directly adjacent to the absorption layer. Furthermore, the total thickness of all bulk transport layers should equal the thickness specification given earlier.

The desorption layer 16 preferably consists of any of the materials and any combinations thereof as described above, which achieve the stated conditions. This layer is chemically treated with a highly hydrophobic material such as, but not limited to, PTFE or impregnated with small carbon or graphite spheroids coated with the same highly hydrophobic material, referred to as desorption-layer impregnation particles. The chemical treatment and impregnation is accomplished through any of the methods and materials thereof described and suited for the absorption and bulk transport layers. The base material of the desorption layer is a highly porous, compressible material having adequate tensile and compressive strengths to withstand the applied loads. It preferably has a pore-size distribution of not less than 10 $\mu$m and no more than 250 $\mu$m, a mode pore-size between 25 $\mu$m and 200 $\mu$m, and a mean pore-size between 50 $\mu$m and 150 $\mu$m. Preferably, no more than 20% of its porosity is lost under the compressive force used to form PEM fuel cell stacks. When it is compressed under load, the base-material fibers (nominally 5 to 150 $\mu$m in diameter) and optional impregnation particles (nominally 0.1 to 5 $\mu$m in diameter), achieve intimate contact along the lands 18 of the cathode gas-distributor plate 1.

EXAMPLE 1

Evaluation of Materials

The key materials, treatments and methods described above were evaluated based on test samples. Comparative test samples were also included. Wettability and surface energy data were obtained and are shown in FIGS. 4–6.

1. Materials Tested
   A. Contact angle as a function of time using a goniometer.
      1. Untreated (unhydrophobidized) Toray 090 graphite-fiber paper; 0.26 mm thick.
      2. Hydrophobidized (10 wt % PTFE) Toray 090 graphite-fiber paper; 0.26 mm thick.
      3. Hydrophobidized (10 wt % PTFE) Toray 090 graphite-fiber paper with interfacial surface treatment Method 1 (new porous ceramic vacuum chuck); 0.26 mm thick.
      4. Hydrophobidized (10 wt % PTFE) Toray 090 graphite-fiber paper with interfacial surface treatment Method 2 (old non-porous vacuum chuck with drilled holes); 0.26 mm thick.
      5. Untreated (unhydrophobidized) Spectracarb 2050 graphite-fiber paper; 0.27 mm thick; 0.53 g/cm$^3$.
      6. Hydrophobidized (9.5 wt % PTFE) Spectracarb 2050 graphite-fiber paper; 0.27 mm thick; 0.53 g/cm$^3$.
      7. Untreated (unhydrophobidized) Stackpole graphite-fiber paper; 0.37 mm thick; 0.34 g/cm$^3$.
      8. Hydrophobidized (13 wt % PTFE) Stackpole graphite-fiber paper; 0.37 mm thick; 0.34 g/cm$^3$.
      9. Untreated (unhydrophobidized) Spectracarb 2050 graphite-fiber paper; 0.27 mm thick; 0.38 g/cm$^3$.
      10. Hydrophobidized (12.5 wt % PTFE) Spectracarb 2050 graphite-fiber paper; 0.27 mm thick; 0.38 g/cm$^3$.
   B. Determination of surface energy of porous solid using Zisman method.
      1. Untreated (unhydrophobidized) Toray 090 graphite-fiber paper; 0.26 mm thick.
      2. Hydrophobidized (10 wt % PTFE) Toray 090 graphite-fiber paper; 0.26 mm thick.
      3. Hydrophobidized (17 wt % PTFE) Toray 090 graphite-fiber paper; 0.26 mm thick.

Figure 4:
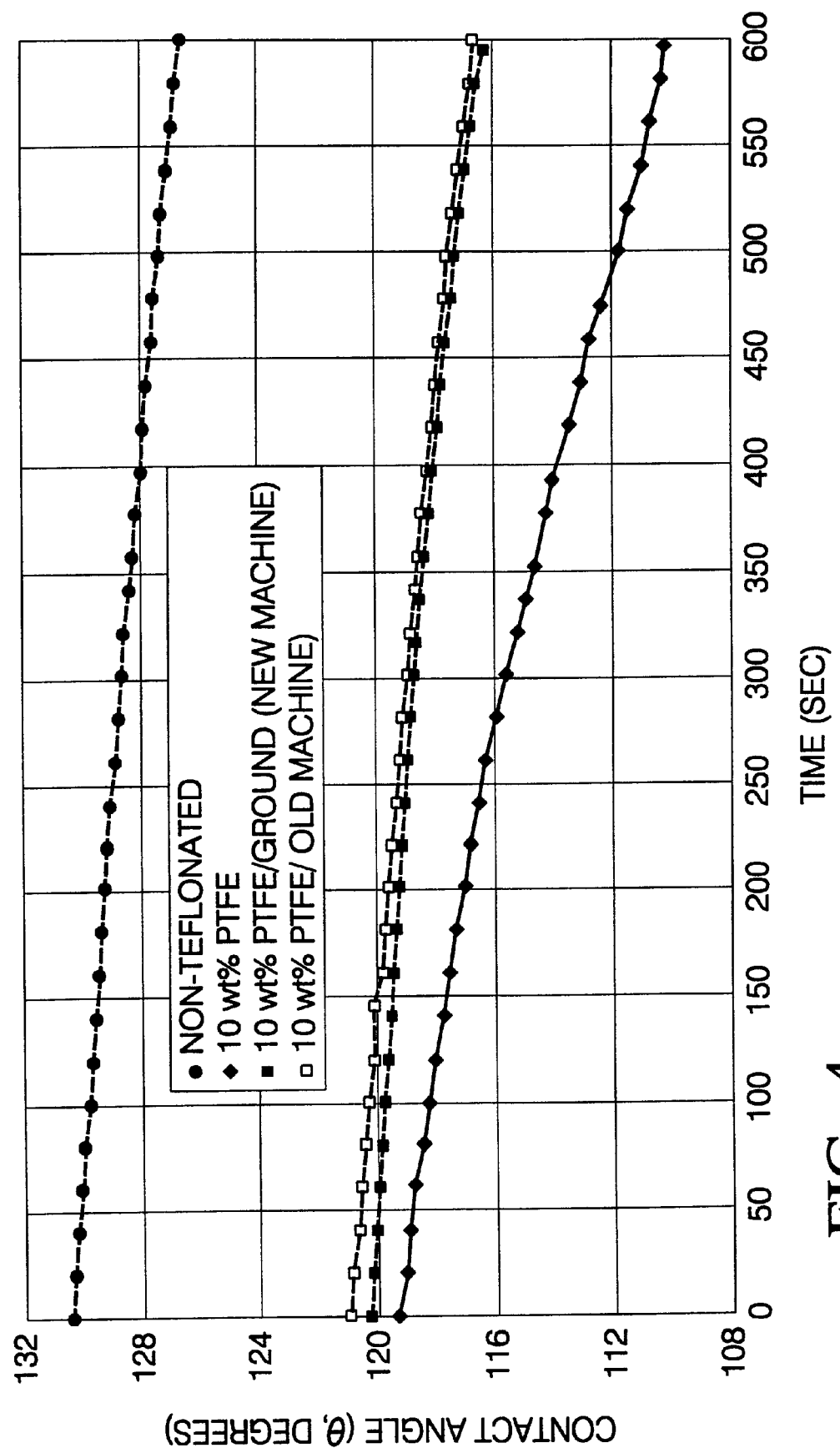
FIG. 4 is a graph showing plots of contact angle versus time for samples of Toray brand graphite-fiber paper, treated and untreated as per Example 1.
Figure 5:
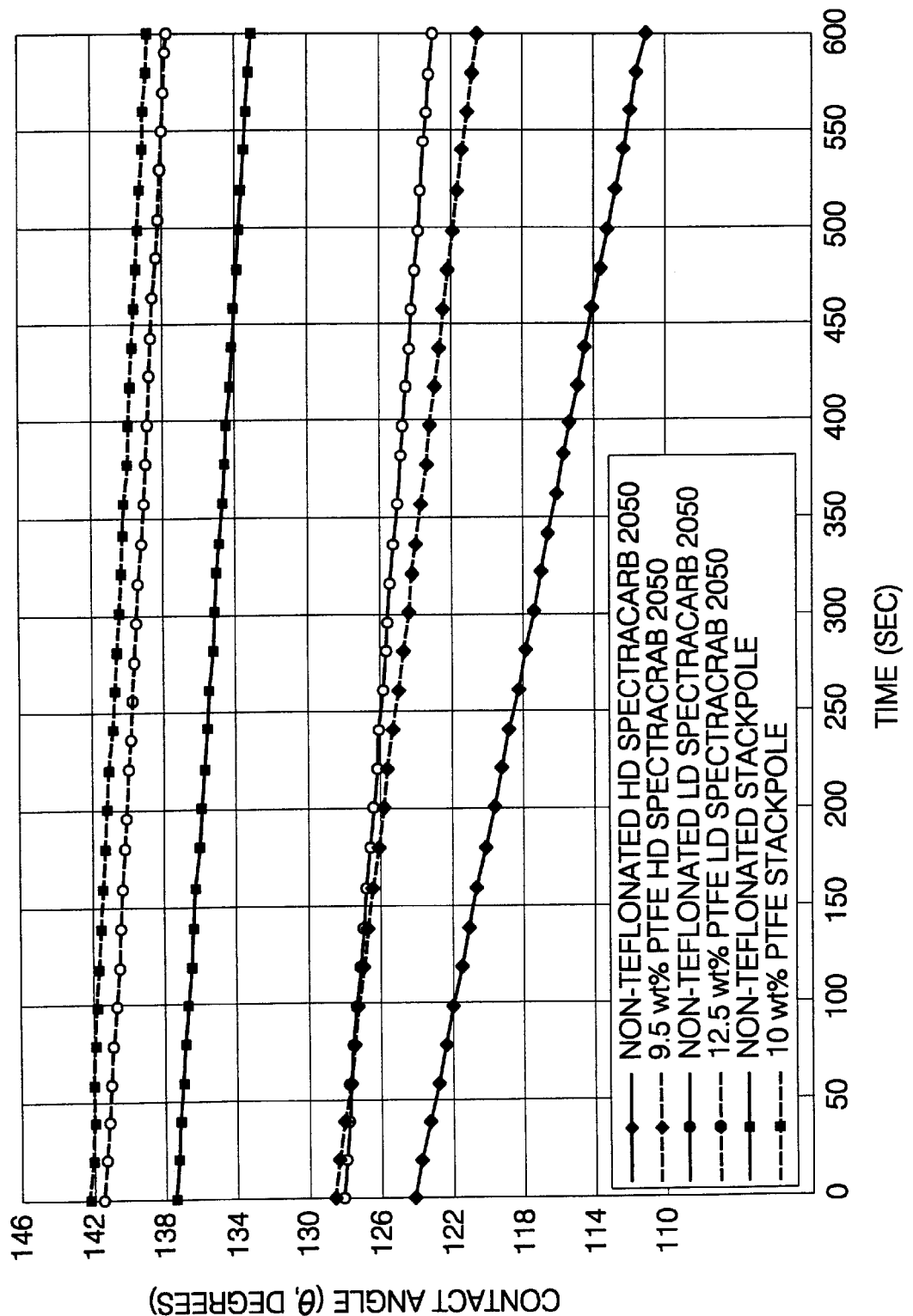
FIG. 5 is a graph showing plots of contact angle versus time for samples of Spectracarb brand graphite-fiber paper, treated and untreated as per Example 1.
Figure 6:
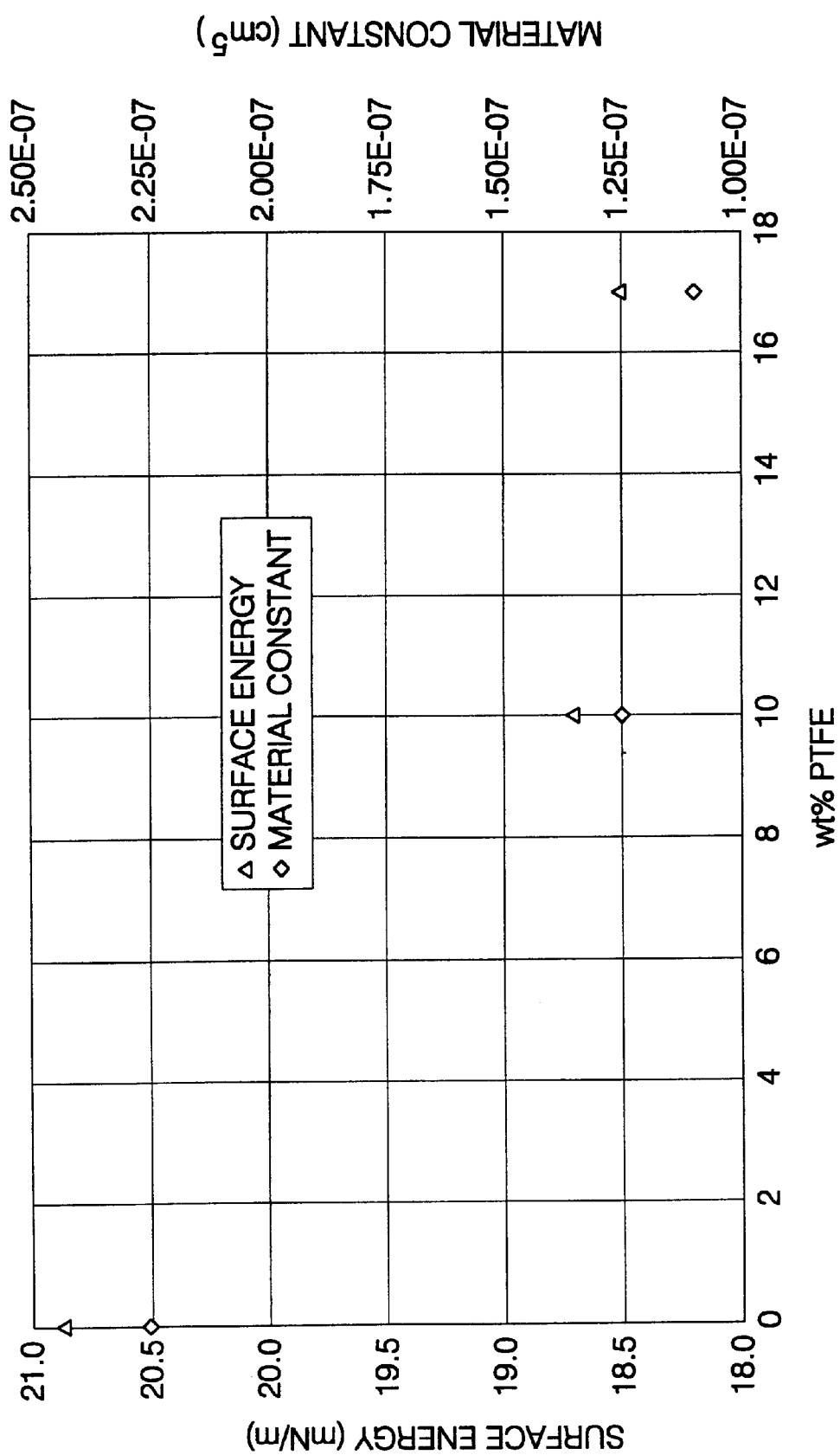
FIG. 6 contains plots of surface energy and material constants of the Toray brand graphite-fiber paper versus various values of PTFE weight percentages.

Referring to the results in FIGS. 4 to 6, grinding of the surface of the (standard) cathode diffusion medium in contact with the electrode layer improves the rate of water absorption into the diffusion medium because the contact angle is reduced after grinding. FIG. 4 shows the contact angle data for Toray 090, and it can be seen that the initial contact angle of the ground Toray 090 paper is about 10° less than the unground Toray 090. The slopes are approximately equal, though, indicating that the drop has an easier time penetrating the surface initially but does not traverse the diffusion medium pores any faster once it has penetrated. It is reasonable to conclude from FIG. 4 that there is no significant difference in water absorption characteristics between the two grinding methods.

The trends of increasing initial contact angle and decreasing magnitude of slope with Teflon addition are present for all three materials shown in FIG. 5 and are consistent with the Toray 090 results in FIG. 4. It is not known exactly what this means with regard to water retention, but it is definitely the wrong direction to be heading with regards to water absorption. It is also interesting to note that the high-density (HD) Spectracarb 2050 wets better than the low-density (LD) Spectracarb 2050, confirmed by the lower contact angle values and steeper slopes obtained with the HD Spectracarb. This observation could be explained with the aid of Equations 1 and 2. Even though the less dense Spectracarb has more void volume for liquid transport ($r^5$ in Equation 2 is higher), there could be many more pores in the more dense version ($r^5$ is lower, but $n^2$ is much higher in Equation 2) which would offset the loss in mean pore radius and make it less in Equation 1 because of more capillary action. Equations 1 and 2 are described below. This finding is an important one because it shows that simply discussing the porosity, or void volume, is a misleading oversimplification of the issue of mass transfer in the cathode diffusion medium. Void volume tells us nothing about capillary action, tortuosity, pore radius, fiber surface area, or porosity losses, all of which are absolutely imperative to our overall understanding of cathode mass transport phenomena.

Wetting, or penetration of water droplets at the cathode diffusion medium surface is encouraged by having high surface energy (see FIG. 6) and low contact angle (see FIG. 4 and FIG. 5). The interface formed between the cathode reaction layer and its diffusion medium is the location where these parameters are most important. If the rate of water formation and electro-osmosis are high (high operating current density) relative to the rate of absorption of water into the diffusion medium macropores, flooding of the cathode catalyst layer will occur. Since contact angle is a direct measure of surface absorption (wetting) affinity of a liquid and fundamental surface chemistry science states that the tendency of a solid to wet with any arbitrary liquid increases with decreasing contact angle, the face of the cathode diffusion medium in contact with the cathode reaction layer should have as low of a contact angle with water as possible.

Porosity of the diffusion medium material is significantly compromised by the addition of Teflon. From the Zisman surface energy testing, the material constant (c) decreased by 44.6% with 10 wt % Teflonation and by 48.6% with 17 wt % Teflonation (see FIG. 6). Using Equation 2 and the material constant data shown in FIG. 6, it was determined that there is an 11.1% loss in mean pore radius when Toray 090 is treated with 10 wt % PTFE. This is a significant loss and directly affects the vapor phase mass transfer rates in an adverse manner, which mathematically translates into lessening the effective binary diffusion coefficients.

Without being held to any particular theory, the following explanation is thought to apply. Wetting of porous solids is based on the Washburn theory which states that when a liquid is brought in contact with a solid surface, the square of the mass of liquid which is absorbed by capillary action is directly proportional to the absorption time (length of time after the two are brought in contact). It is also dependent on physical properties of the liquid and solid and is expressed mathematically for a "wetting" liquid as $$t = [\eta/(c\rho^2 \sigma \cos\theta)]m^2, \text{ where } 0° \leq \theta \leq 90° \qquad \text{Equation 1}$$

where t is the time after the liquid is brought in contact with the solid, m is the mass of liquid absorbed, $\eta$ is the liquid viscosity, c is the material constant of the solid, $\rho$ is the liquid density, $\sigma$ is the liquid surface tension, and $\theta$ is the advancing contact angle of the wetting liquid on the solid surface. The material constant (c) is analogous to porosity, but it is somewhat more specific because it is a function of mean pore radius (r) and the number of pores in a given sample size (n). Its theoretical expression appears as $$c = 0.5\Pi^2 r^5 n^2 \qquad \text{Equation 2}$$

Using Equations 1 and 2, it can quickly be determined that wetting time is inversely proportional to mean pore radius and number of pores. Furthermore, the wetting time is more sensitive to the radius of the pores than the actual number of pores present, indicated by the respective powers of these two parameters. Equation 1 also shows that wetting time increases with increasing contact angle, and that as $\theta$ approaches 90°, the theoretical time for absorption approaches infinity (cos 90°=0). The contact angle(s) and material constant are determined experimentally and are used to estimate the surface energy of a particular porous solid. It should be pointed out here that Washburn's theory (with Equations 1 and 2) is a simple case and does not directly apply to this system. Washburn's theory is the fundamental basis for the nature of this invention. In the system discussed here, θ (in Equation 1) can be greater than 90°. In addition, θ is a function of time, and the fluid may cross from the non-wetting regime (θ>90°) to the wetting regime (θ<90°) with time.

Once the droplets penetrate the face of the diffusion medium, the hydrophobic coating of Teflon around the individual fibers of the diffusion material begins to aid water transport towards the gas flow channels. We now want a high contact angle between the liquid water droplet and the pore wall. A droplet will be enticed to slide along the coated fiber walls rather than stick to it, as it would if there were no Teflon present. Numerically, the interfacial surface tension is to be high and the surface energy of the fibers is to be low. This translates mathematically into $$\theta = \cos^{-1}[(\sigma_S - \sigma_{SL})/\sigma_L] \rightarrow 180° \quad \text{Equation 3}$$

Which is Young's equation for a perfectly non-wetting liquid and $\sigma_S$ is the surface energy of the diffusion medium material, $\sigma_{SL}$ is the interfacial surface tension, and $\sigma_L$ is the liquid water surface tension. The issue here is how close to 180° is it desired to be. There are most likely trade-offs involving interfacial surface tension between the coated fiber walls and the water droplets and the associated losses in electrical conductivity. Most hydrophobic materials are electrically resistive.

To simplify the concept of surface energy, it is a characteristic value associated with a porous solid that describes its ability to be wet by an absorbing liquid. Zisman, a researcher with a widely accepted theory for surface energy, defines it as the value of the surface tension of a real or imaginary liquid which has the highest possible surface tension that will still allow the liquid to wet with a 0° contact angle. In mathematical terms, it is the liquid surface tension where $\sigma_S - \sigma_{SL} = \sigma_L$ in Equation 3 and gives an inverse cosine of θ=0°. A solid's surface energy may also be thought of as the highest surface tension, perfectly wetting liquid in contact with that solid. A high surface energy means that it is thermodynamically favorable (−ΔH, +ΔG) for the liquid phase to be in contact with the solid phase. A low surface energy means the solid likes to be in contact with the air; it does not want the liquid against its surface.

Wicking is enhanced with increasing surface energy and decreasing contact angle. Chemically treating the cathode diffusion medium in the manner of the invention and/or surface grinding is thought to further enhance wicking.

Figure 7:
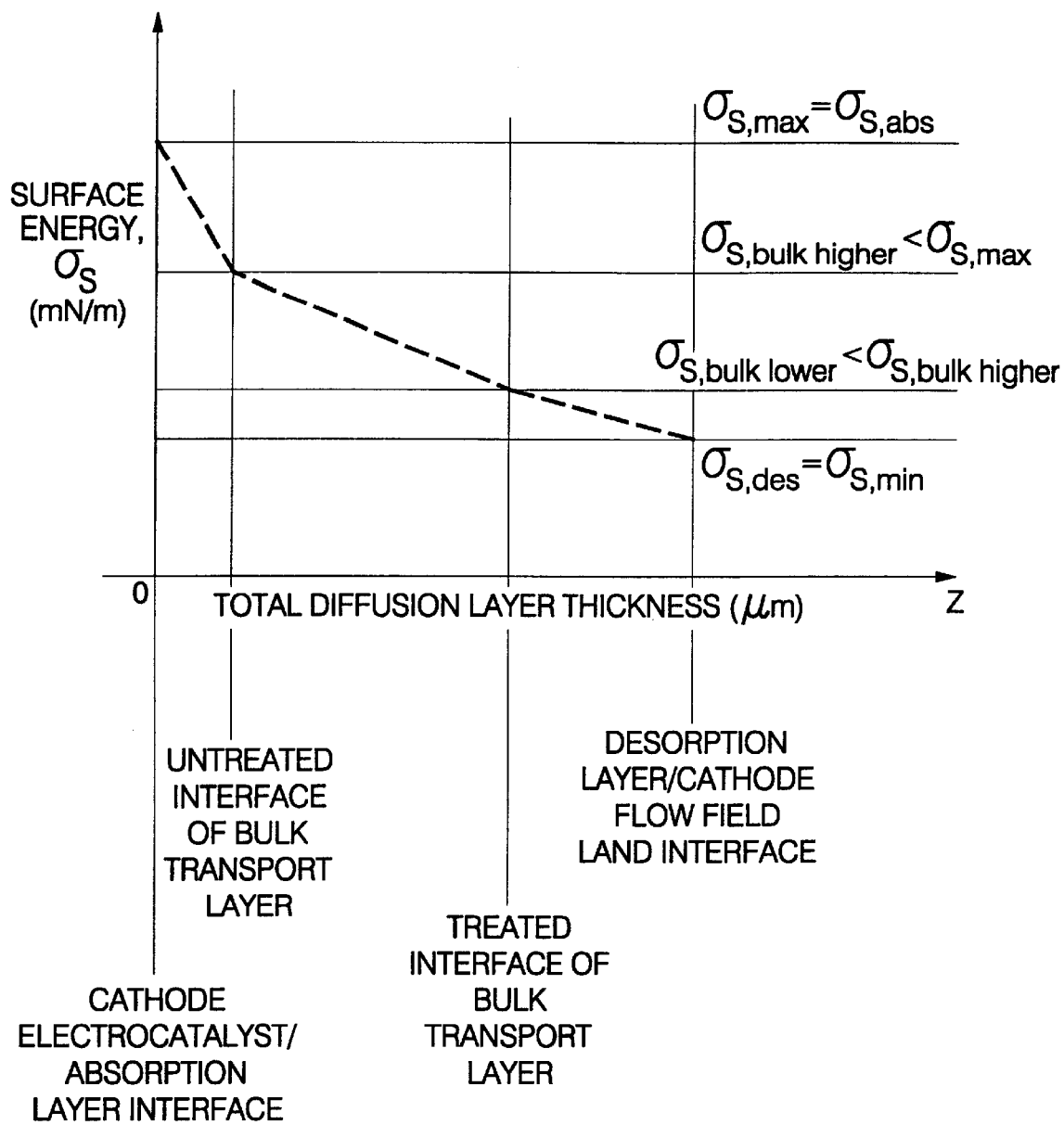
FIG. 7 is a plot of a decreasing surface energy profile for a multilayer diffusion structure prepared as per Example 2.

The concept of changing surface energy and changing contact angle is illustrated in FIG. 7 which shows a preferred diffusion structure with a decreasing surface energy. The arrangement is based on Example 1.

Water retention of the cathode diffusion medium, or suppression of transport of the liquid phase across the diffusion medium from the electrode interface to the gas channel interface, increases as the absolute value of the slope of contact angle versus time decreases. Mathematically, it is preferred that $$|d\theta(t)/dt| \rightarrow \infty \quad \text{Equation 4}$$

where again θ is the contact angle of water on the surface of the porous diffusion medium, so that any given volume element of liquid water spends the least amount of time penetrating the surface as possible. FIG. 4 shows that the slope of the untreated, unground Toray 090 has the highest slope magnitude; but is has been determined that it performs terribly under high water-content conditions in an actual cell due to water-logging. The design challenge identified here is how to optimize the rate of absorption of water at the surface and minimize the retention time of any arbitrary volume element of water inside the diffusion medium. The features of the invention described herein, achieve both objectives. Selection of materials, treatments and processing technique which vary for layers within the diffusion structure, produces different physical consequences depending on the location of a volume element of liquid water in the diffusion structure.

A distinction is made between the wt % Teflon added to a diffusion medium and the thickness of the Teflon coating around the individual fibers. A very thin, uniform coating of the bulk fibers is sufficient to make them hydrophobic. Therefore, the weight of Teflon used is minimized, certain pores are not plugged with excess Teflon, and conductivity losses are minimized.

Finally, de-wetting of the cathode diffusion medium, or the receding contact angle, at the gas flow channel is also considered in the design. In the diffusion structure design of the invention, the rate of desorption of water from the cathode diffusion medium macro pores is not highly dependent on the bulk flow rate of air in the flow channel. Here, the rate at which a water droplet desorbs is high because of a high receding contact angle, regardless of the droplet volume. This is in contrast to conventional design where the droplet desorbs only because it finally becomes large enough to be pulled into the bulk gas flow because of momentum transfer. The invention provides an optimized desorption mechanism achieved through proper treatment of this interfacial surface of the diffusion structure.

EXAMPLE 2

Preparation of Multi-Layered Diffusion Structure

A. Preparation of Absorption Layer Dispersion 14

The absorption layer dispersion is prepared in a form suitable for applications to the bulk transport layer.

1. Select the electrically conductive particle which is synthetic graphite powder (0.025 μm≦dia.≦2.5 μm, but preferably 0.05 μm≦dia.≦0.75 μm). Select binder raw material which is Kynar 741™ PVDF powder (0.01 μm≦dia. ≦1 μm, but preferably 0.025 μm≦dia.≦0.5 μm) for this example. Within the absorption layer, the graphite particles serve as the substrate for the PVDF particles in the finished product.

2. Pre-mix the powders of step 1 until essentially homogeneous consistency on a granular level is achieved. This mixture constitutes the solids portion of the dispersion.

3. Form the absorption-layer dispersion by mixing the solids phase with a liquid diluting agent. Here, a 50/50 vol % blend of methanol and DI water and constitutes the liquids portion of the dispersion. Depending on the solvent and powders selected, the solvent may be in the nature of a carrier or may solubalize the powder(s).

4. The solid and liquid phases are thoroughly pre-mixed through conventional stirring methods (magnetic stir bar, etc.). A small amount of appropriate surfactant may be added to improve the dispersion quality. Then, mixing resumes to achieve an essentially homogeneous consistency with the aid of ball-milling equipment. Mixing times are not critical.

5. The absorption-layer dispersion (precursor mixture) is placed into an appropriate container to be applied by conventional spray method.

6. Optionally, the quality of the ink is analyzed before spraying by techniques such as percent-solids analysis and solid-phase elemental composition such as X-ray Fluorescence Spectroscopy (XFS), Electron Probe Microanalysis (EPMA), X-ray Photoelectron Spectroscopy (XPS), and the like.

B. Preparation of A Bulk Transport Layer 15

1. Select the raw material for this layer, which is preferably a non-woven graphite-fiber mat (paper, felt, etc.) having pore-size distribution between 0.5 $\mu$m and 60 $\mu$m, mode pdre-size between 1 $\mu$m and 50 $\mu$m, mean pore-size between 5 $\mu$m and 40 $\mu$m; and uncompressed thickness between 150 $\mu$m and 400 $\mu$m. These values are able to be determined by Capillary Flow Porometry or Mercury Intrusion Porosimetry.
2. This mat is chemically treated such that one half of its thickness contains between 0.5 and 10 wt % of a chemical agent introduced to create intermediate hydrophobicity within this half of the bulk transport layer. For this example, the chemical agent is polytetrafluoroethylene (PTFE) obtained from the base material Teflon 30™ dispersion. The dispersion is sprayable in raw form; however, it may also include a diluent (such as DI water, methanol, isopropanol, ethylene glycol, propylene glycol, etc.) and/or surfactant(s) such that droplet size and penetration depth of the chemical agent into the bulk transport layer is controlled.
3. Apply chemical agent through conventional spraying techniques in a class 100,000 or better clean room, yielding a first portion of the bulk layer which is treated, and a second portion of the bulk layer that is untreated.
4. Heat treat the Teflonated layer by drying, curing, and sintering/melting (sintering for PTFE) steps.
5. Optionally, conduct quality check with XFS or EPMA for elemental composition; and Drop Shape Analysis (DSA) contact angles for surface quality.
6. Optionally, confirm differing surface energy characteristic of the treated and untreated portions. Determine (solid/vapor) surface energy of each face of this layer using a tensiometer. According to a preferred embodiment described herein, the surface energy of the untreated half is at least 5% greater than that of the treated half.

C. Application of the Absorption Layer Dispersion to the Bulk Transport Layer

1. Complete the bulk transport layer as per Section B immediately prior to the completion of mixing of the absorption-layer dispersion, so that stagnation, agglomeration, and settling time for this dispersion are minimized after its preparation as per Section A.
2. Apply the absorption-layer dispersion to the surface of the untreated portion of the bulk transport layer using conventional spraying techniques. Careful application will facilitate attainment of the desired final properties of the absorption layer and the percentage of overlap between the absorption and bulk transport layers. This step should take place in a humidity-controlled, class 100,000 or better clean room.
3. Heat-treat the freshly applied absorption layer.

For this example, a two-step cycle (drying and sintering/melting)is used. If a surfactant was used in the absorption-layer dispersion ink, then a curing step is included between the drying and sinter/melt heat treatments.
4. Optionally, elemental composition is conducted by XRF, EPMA, XPS, etc. and surface QA of the exposed face of the absorption layer is characterized through DSA contact angles.
5. Optionally, confirm surface energy characteristic of the exposed surface of the absorption layer. Determine the (solid/vapor) surface energy of the exposed face of the absorption layer, or face to be in direct contact with the cathode catalyst layer 8 of the MEA 3, using a tensiometer. According to a preferred embodiment described herein, the surface energy is at least 10% greater than the surface energy of the untreated half of the bulk transport layer.
6. The finished absorption layer preferably has a pore-size distribution between 0.0$\mu$m and 5 $\mu$m, mode pore-size between 0.05 $\mu$m and 2 $\mu$m, mean pore-size between 0.1 $\mu$m and 1 $\mu$m; and uncompressed thickness between 20 $\mu$m and 70 $\mu$m. These values are able to be determined by Capillary Flow Porometry or Mercury Intrusion Porosimetry.

D. Construction of the Desorption Layer 16

1. The first raw material for the desorption layer is a macroporous graphite-fiber non-woven with high compressive and tensile strengths. It preferably has a pore-size distribution of between 10 $\mu$m and 250 $\mu$m, mode pore-size of between 25 $\mu$m and 200 $\mu$m, mean pore-size between 50 $\mu$m and 150 $\mu$m; and an uncompressed thickness between 200 $\mu$m and 500 $\mu$m.
2. Next it is chemically treated with PTFE preferably by dipping or spraying such that the loading of PTFE is at least 10 wt %. In this example, if sprayed, it would be prepared similarly to steps B-2 through B-4 above.
3. Optionally conduct QA check for the desorption layer using XFS or EPMA for elemental composition; and Drop Shape Analysis (DSA) contact angles for surface quality.
4. Optionally, confirm surface energy characteristic of the desorption layer. Determine the surface energy of the desorption layer, either face. According to a preferred embodiment described herein, its surface energy is at least 5% less than the surface energy of the treated half of the bulk transport layer.

E. Assemble Multilayered Cathode Diffusion Medium 7 into PEM Fuel Cell Assembly

1. Place the exposed face of the absorption layer directly adjacent to the cathode electrocatalyst layer 8 of an MEA 3. This leaves exposed the treated portion of the bulk transport layer.
2. Place the desorption layer directly adjacent to treated (exposed) portion of the bulk transport layer, which in turn, lays directly against the cathode flow field lands 18.

FIG. 7 shows a graphical plot for the preferred alternative of decreasing surface energy gradient in a multilayered diffusion structure formed according to Example 2. The subscripts in FIG. 7 correspond to those listed in Table 1. Table 1 lists the physical features tailored to fit a decreasing surface energy gradient in a direction from absorption layer to desorption layer.

The curvature (magnitude) and the sign of the slope of this curve (gradient) are useful mathematical/physical parameters for quantifying the desirable features of the invention and characterizing its performance benefits. In a preferred embodiment, the characteristics are adapted to provide decreasing surface energy gradient moving outward from the MEA. At least the bulk layer has a surface energy gradient which decreases in a direction outward from the MEA.

In describing the features of the layers, the terms mean and mode pore size are used. Mean pore size is the statistical pore size corresponding to the pressure differential at which one obtains half the flow of a gas (such as air) through a fully wetted material sample as one would obtain through that same sample at the same pressure differential in a non-wetted state. The preceding definition is based on the capillary flow porometry technique, but it can also be defined by the mercury intrusion porosimetry technique. It would then be the statistical pore size corresponding to the pressure at which half of the total pore volume of the sample is intruded or filled with mercury having begun with an evacuated sample.

Mode pore size, in terms of capillary flow porometry, is the statistical pore size corresponding to the differential pressure at which the largest fraction of the total flow through a fully wetted material sample occurs. Mathematically it is the point at which the derivative of the flow rate vs. differential pressure curve is a maximum. In terms of mercury intrusion porosimetry, it is the pore size corresponding to the pressure at which the largest fractional change in total intrusion volume of an evacuated sample occurs.

In another aspect of the invention, there is overlap by the absorption and desorption layers into respective sides of the bulk transport layer. Overlap is defined as that percentage of the thickness of the absorption or desorption layers, which penetrates the adjacent bulk transport layer. The overlap, or percent penetration, of both the absorption and desorption layers is preferably at least 5% but not more than 40%. The exemplary thicknesses of layers mentioned earlier include the percentage of overlap.

In summary, the invention solves the problems of mass transfer and electrical resistances which occur with conventional diffusion structure. The invention provides layering techniques, together with strategic selection of materials to solve the diffusion-structure-contact-resistance problem at the same time as solving the microscopic water-management problem at the cathode under operating conditions mentioned earlier, is predominantly a water "removal" problem. By making the physical structures of the absorption and desorption layers similar to the physical structures of the materials with which they interface (the cathode catalyst layer and cathode flow field lands, respectively), the contact resistances at these interfaces is reduced.

The invention overcomes problems posed by the conventional use of high compression forces (between 100 and 200 psig) to alleviate contact resistance problems at the various interfaces of a PEM fuel cell assembly. The invention permits use of lower compression load sufficient to ensure sealing of the reactant, product, and coolant streams. This advantage is achieved because the component interfaces are optimized and the interfacial physics have been specifically engineered. Since the invention reduces these inherent contact resistances, lower compressive forces are useable for PEM fuel cell stacks, which results in lower stack mass and volume and higher stack reliability.

The invention provides microscopic water management at the cathode which improves fuel cell stack performance through indirect optimization of the vapor phase transport. It also provides a stack subsystem which is highly responsive to transient variations of operating conditions. This results in a more responsive overall electrochemical propulsion system, and simplification of system water management which currently consists of vaporization, condensation, recycling, and the associated flow controls. Finally, the invention is cost-effective and readily adaptable to high volume manufacture and assembly of fuel cell systems.

TABLE 1

DESIRED RANGED OF PHYSICAL PROPERTIES FOR EACH LAYER OF MULTILAYERED CATHODE DIFFUSION MEDIUM WITH DECREASING SURFACE ENERGY GRADIENT

| Property (Parameter) | Absorption Layer | Bulk Transport Layer | Desorption Layer | Property Code (Below) |
|---|---|---|---|---|
| Porous Structure Properties | | | | |
| Pore-Size Distribution (Low to High, µm) | 0.05 to 5 | 0.05 to 60 | 10 to 300 | A |
| Mode Pore Size (Low to High, µm) | 0.075 to 2 | 1 to 50 | 25 to 200 | B |
| Mean Pore Size (Low to High, µm) | 0.01 to 1 | 5 to 40 | 50 to 150 | C |
| Porosity (Void Volume %) | 50 to 75 | 60 to 90 | >=70 | D |
| Gravimetric Surface Area (m$^2$/g) | 25 to 300 | 0.1 to 5 | 0.05 to 1 | E |
| Interface Properties | | | | |
| Uncompressed Thickness (µm) | 20 to 100 | 100 to 750 | 40 to 400 | F |
| Thickness Overlap w/Bulk Transport Layer (%) | 5 to 40 | N/A | 0 to 40 | G |
| Solid/Vapor Surface Energy (nM/m = dynes/cm) | >=25 | 15 to 35 | <=25 | H |
| Dynamic Water Contact Angle (°) | 60 to 110 | 90 to 145 | >=125 | K |
| Stipulations for Invention Properties | | | | |

(Subscripts: Absorption Layer = abs, Bulk Transport Layer = bulk, Desorption Layer = des)
To achieve DECREASING surface energy gradient moving outwards from MEA (3):

$B_{abs} < B_{bulk} < B_{des}$
$C_{abs} < C_{bulk} < C_{des}$
$E_{abs} > E_{bulk} > E_{des}$
$F_{abs} < F_{bulk} < F_{des} <= F_{bulk}$
$H_{abs} > H_{bulk} > H_{des}$ While this invention has been described in terms of certain embodiments thereof, it is not intended that it be limited to the above description, but rather only to the extent set forth in the following claims.

The embodiments of the invention in which an exclusive property or privilege is claimed are defined in the following claims:

What is claimed is:

1. An assembly for an electrochemical cell comprising a composite diffusion structure, and an electrode structure having first and second opposed major surfaces, said diffusion structure comprising:

an absorption layer with third and fourth opposed major surfaces and comprising a first electrically conductive material, said third surface engaging said second surface of said electrode structure and arranged to accept water at said third surface;

a bulk layer with fifth and sixth opposed major surfaces and comprising a second electrically conductive material, said fifth surface engaging said fourth surface of said adsorption layer, said bulk layer comprising at least two portions, a first portion adjacent said fifth surface and a second portion adjacent said sixth surface, where said first portion is less hydrophobic than said second portion;

a desorption layer with seventh and eighth opposed major surfaces and comprising a third electrically conductive material, said seventh surface engaging said sixth surface of said bulk layer and said eighth surface facing away from the electrode structure to release water at said eighth surface.

2. The assembly of claim 1 wherein said bulk layer comprises at least one intermediate portion between said first and second portions, and where the hydrophobicity of each said intermediate portion is greater than said first portion and less than said second portion.

3. The assembly of claim 2 having a plurality of said intermediate layers between said first and second portions and with decreasing surface energy in a direction from said first portion to said second portion.

4. The assembly of claim 1 further characterized by increasing hydrophobicity between said second and eighth surfaces.

5. The assembly of claim 1 further characterized by decreasing surface energy between said second and eighth surfaces.

6. The assembly of claim 1 further comprising an electrolyte layer engaging said first surface of said electrode structure.

7. The assembly of claim 1 wherein said absorption layer comprises said first electrically conductive material dispersed in a fluorinated polymeric binder (PVDF).

8. The assembly of claim 1 wherein said bulk layer first portion consists essentially of said second electrically conductive material and said second portion of said bulk layer comprises said second electrically conductive material intermingled with polytetrafluoroethylene (PTFE); wherein the amount by weight of said PTFE is less than the amount of said electrically conductive material of said second portion.

9. The assembly of claim 8 wherein said desorption layer comprises said third electrically conductive material intermingled with PTFE, and where the amount of PTFE relative to said third electrically conductive material is greater than the amount of PTFE relative to said second electrically conductive material in said second portion of said bulk layer.

10. The assembly of claim 1 wherein said first, second and third electrically conductive materials are different.

11. The assembly of claim 1 wherein said absorption layer comprises said first electrically conductive material dispersed in a binder which has low hydrophobicity to low hydrophilicity.

12. The assembly of claim 1 wherein said bulk layer first portion consists essentially of said second electrically conductive material and said second portion of said bulk layer comprises said second electrically conductive material intermingled with a first hydrophobic material; wherein the amount by weight of said first hydrophobic material is less than the amount of said electrically conductive material of said second portion.

13. The assembly of claim 12 wherein said desorption layer comprises said third electrically conductive material intermingled with a second hydrophobic material which is more strongly hydrophobic than said first hydrophobic material, and where the amount of said second hydrophobic material relative to said third electrically conductive material is greater than the amount of said first hydrophobic material relative to said second electrically conductive material in said second portion of said bulk layer.

14. An assembly for an electrochemical cell comprising a composite diffusion structure, and an electrode structure having first and second opposed major surfaces, said diffusion structure comprising:

an adsorption layer with third and fourth opposed major surfaces and comprising a first electrically conductive material, said third surface engaging said second surface of said electrode structure and arranged to accept water at said third surface;

a bulk layer with fifth and sixth opposed major surfaces and comprising a second electrically conductive material, said fifth surface engaging said fourth surface of said adsorption layer, said bulk layer comprising at least two portions, a first portion adjacent said fifth surface and a second portion adjacent said sixth surface, where said first portion has a surface energy greater than said second portion;

a desorption layer with seventh and eighth opposed major surfaces and comprising a third electrically conductive material, said seventh surface engaging said sixth surface of said bulk layer and said eighth surface facing away from the electrode structure to release water at said eighth surface.

15. The assembly of claim 14 further characterized by the surface energy of the material of said fourth and fifth surfaces being approximately the same, the surface energy of the material of said sixth and seventh surfaces being approximately the same and different from that of said fourth and fifth surfaces.

16. The assembly of claim 14 wherein said bulk layer comprises at least one intermediate portion between said first and second portions, and where the surface energy of each said intermediate portion is between that of said first portion and said second portion.

17. The assembly of claim 16 having a plurality of said intermediate layers between said first and second portions and with decreasing surface energy in a direction from said first portion to said second portion.

18. The assembly of claim 14 further characterized by decreasing surface energy between said second and eighth surfaces.

19. The assembly of claim 14 further characterized by decreasing surface energy between said fifth and sixth surfaces.

20. The assembly of claim 14 further comprising an electrolyte layer engaging said first surface of said electrode structure.

21. An assembly for an electrochemical cell comprising a composite diffusion structure, and an electrode structure having a major surface, said diffusion structure comprising:
- a bulk layer in mass transport communication with said major surface of said electrode, said bulk layer comprising a first electrically conductive material, and having at least two portions, a first portion facing said electrode layer and a second portion facing away from said electrode layer, where said first portion is less hydrophobic than said second portion; and
- an absorption layer comprising a second electrically conductive material and having a surface engaging said major surface of said electrode structure and another surface engaging said first portion of said bulk layer.

22. An assembly for an electrochemical cell comprising a composite diffusion structure, and an electrode structure having a major surface, said diffusion structure comprising:
- a bulk layer in mass transport communication with said major surface of said electrode, said bulk layer comprising a first electrically conductive material, and having at least two portions, a first portion facing said electrode layer and a second portion facing away from said electrode layer, where said first portion is less hydrophobic than said second portion; and
- a desorption layer comprising a third electrically conductive material, said desorption layer engaging said second portion of said bulk layer.

* * * * *